Aug. 20, 1968  C. B. GWYN, JR  3,397,454
METHOD AND APPARATUS FOR FORMING COMPOSITE
ELECTRICAL CONTACTS
Filed Aug. 25, 1965  3 Sheets-Sheet 1
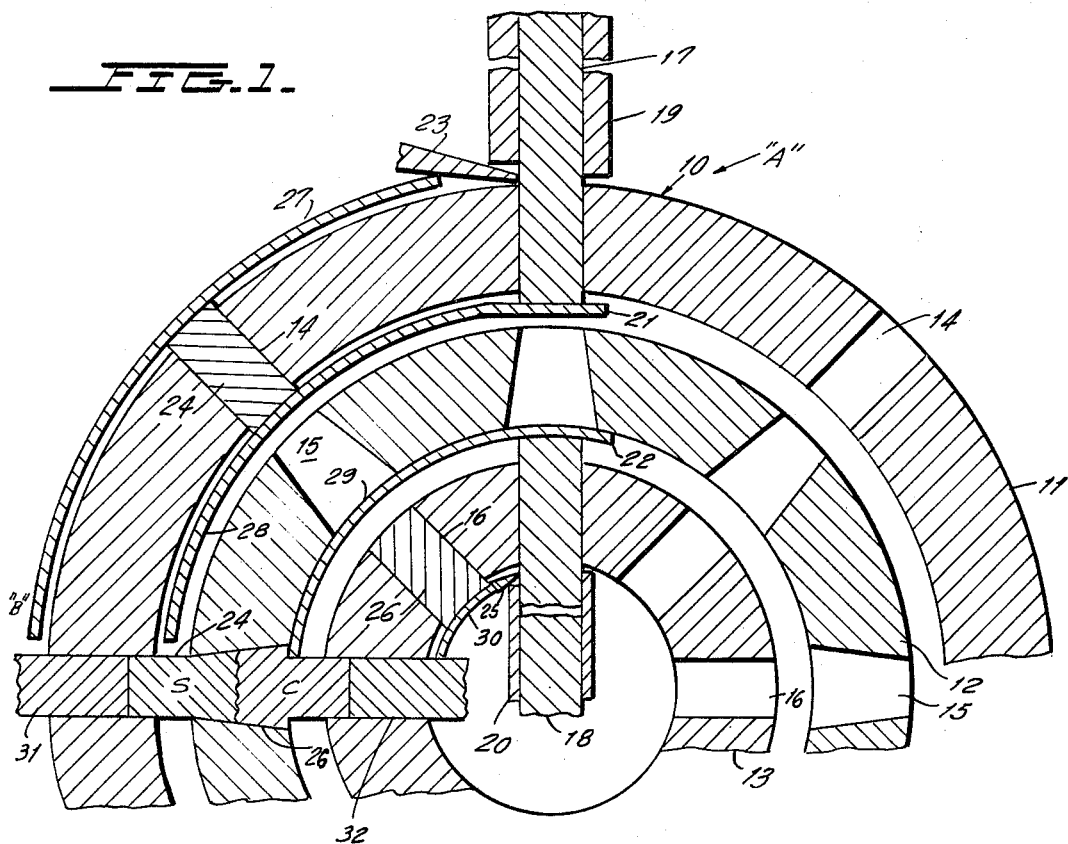
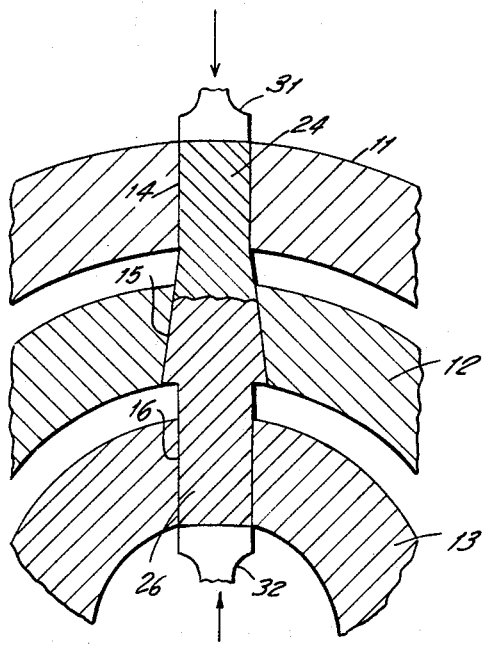
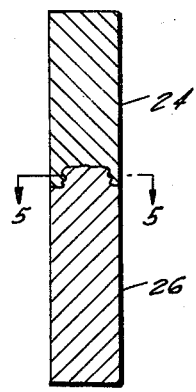
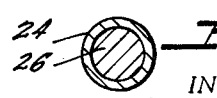
INVENTOR.
CHILDRESS B. GWYN, JR.
BY
OSTROLENK, FABER, GERB & SOFFEN
ATTORNEYS

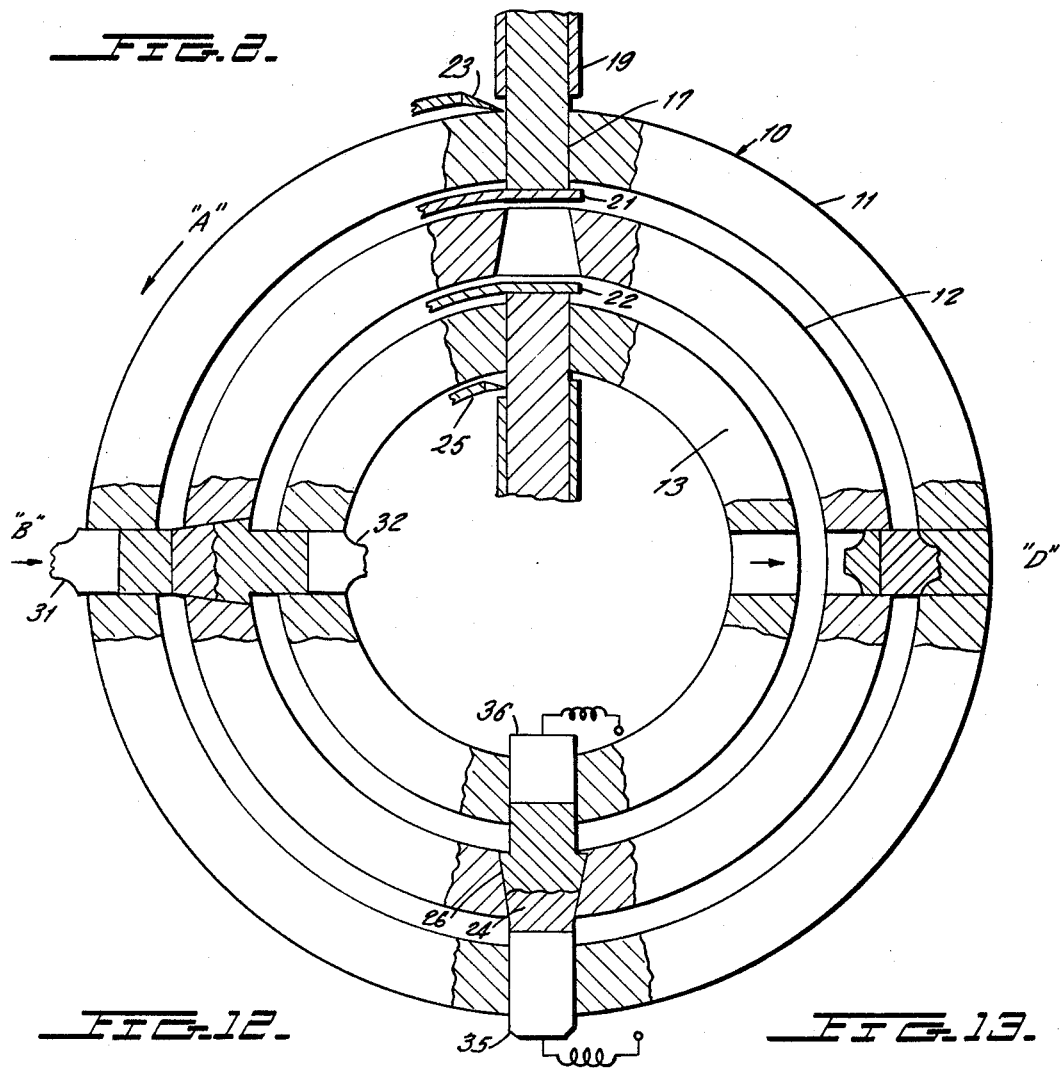
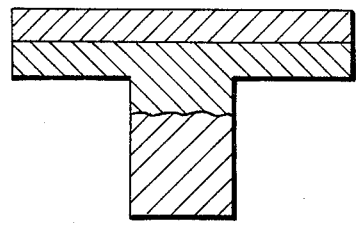
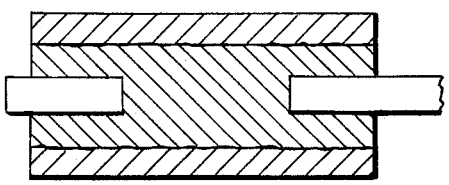
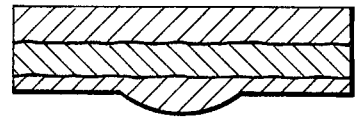
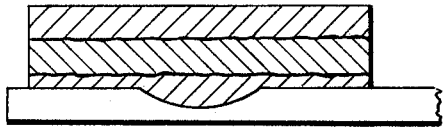

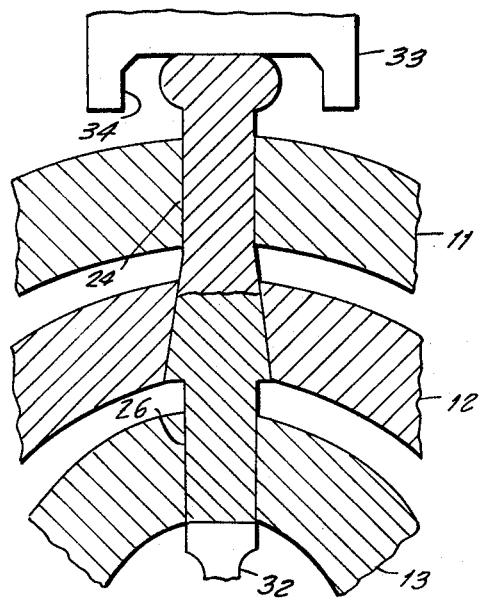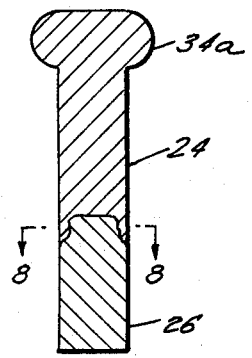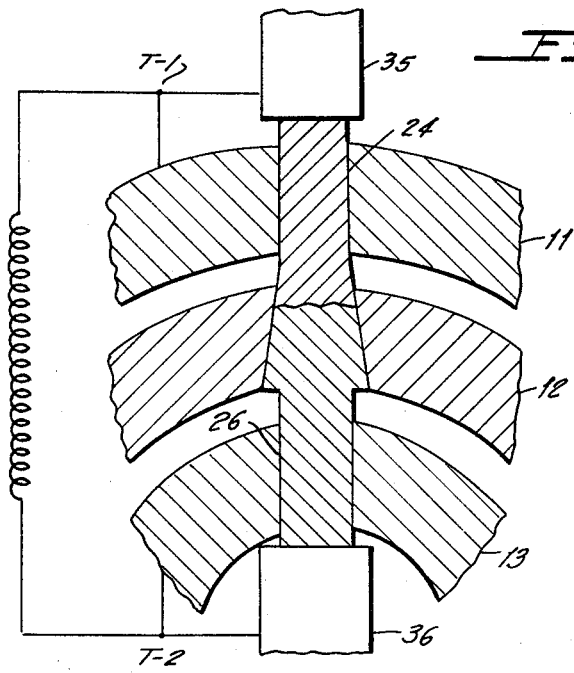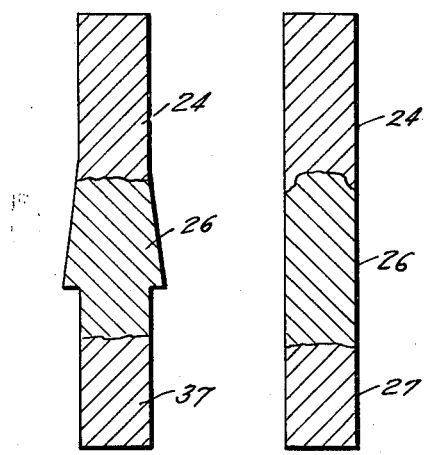

United States Patent Office 3,397,454
Patented Aug. 20, 1968

3,397,454
METHOD AND APPARATUS FOR FORMING COMPOSITE ELECTRICAL CONTACTS
Childress B. Gwyn, Jr., Export, Pa., assignor to Talon, Inc., Meadville, Pa., a corporation of Pennsylvania
Filed Aug. 25, 1965, Ser. No. 482,363
8 Claims. (Cl. 29—630)

ABSTRACT OF THE DISCLOSURE

A method for forming composite electrical contacts is disclosed wherein continuous lengths of metal wires are fed into recesses in a series of rotatable concentric rings constituting a turntable. After the wires are inserted in the recesses they are sheared as a result of the rotation of the rings. Subsequently, axial pressure is applied to the wires to cause their abutment and expansion thereby producing bonding between the wires.

---

This invention relates to a method and apparatus for forming composite electrical contact elements, and, more particularly, to a method and apparatus for the manufacture of integrally bonded contacts, each comprising a contact working face portion and a contact body portion.

Various methods for the manufacture of integrally bonded composite electrical contact elements are known. Among these are relatively complex processes involving brazing and welding operations, each of which may also reinto the finished elements. Other known methods require accurate pre-dimensioning and cleaning of the elements which are to be bonded.

More recently, methods have been proposed for the cold bonding and shaping of composite electrical contact elements. Generally, these procedures involve feeding two or more metal wires or strips into a header or press and subsequently cutting or shearing properly proportioned wire segments therefrom. The segments are then successively positioned in properly shaped dies, cold bonded and simultaneously (or subsequently) formed into final configurations for electrical make-and-break contacts, through the application of one or more rapidly applied forming blows.

One of the major difficulties encountered in the manufacture of composite bonded electrical make-and-break contacts by means of cold bonding and/or electrical welding together of the components thereof, has been the provision of an automated procedure and device suitable for high speed contact production. Such a method of manufacture must provide for feeding the contact components from continuous wire materials, accurately cutting or shearing segments of pre-selected lengths from such wires, positioning the segments, integrally cold bonding or welding the same together, and simultaneously or subsequently shaping the composite element to the required dimensions. Illustrative of several useful methods of accomplishing these automated methods and procedures are those disclosed in copending application Ser. No. 431,-310 filed Feb. 9, 1965, entitled "Method and Apparatus for Forming Composite Electrical Contact Elements" and copending application Ser. No. 479,071, filed Aug. 12, 1965, entitled "Method of Forming Composite Electrical Contacts."

It is among the objects of the present invention to provide an improved and economic method of forming composite electrical contact elements by cold bonding operations.

A further object of the present invention is to provide an apparatus for the rapid and efficient manufacture of composite intermolecularly bonded electrical contact elements.

More particularly, it is an object of the present invention to provide an improved method and apparatus for the automatic high-speed sequential production of composite electrical make-and-break contact elements, by means of intermolecular cold bonding and/or welding.

These and other objects of the present invention will become more readily apparent from the ensuing detailed description and illustrative embodiments.

Generally, the method and apparatus of this invention comprises feeding continuous lengths of metal wires into recesses provided in a series of rotatable rings which constitute a turntable. Rotation of the rings forces the ends of the wires projecting out of the recesses against shear or cut-off blades, shearing the wires into segments of appropriate lengths, and positioning at least two of such segments, one of which is constituted of a contact working face portion material, and the second of which is constituted of a contact body portion material, in spaced end-to-end relation. After a predetermined angular displacement of the wire segments through rotation of the turntable, they are subjected to axial pressure which forces the segments into abutment and forms an intermolecular bond therebetween. Subsequently, the joined wire segments may be further rotated and either ejected from the apparatus of subjected to additional forming, shaping or bonding processes, if required, all of which are hereinafter described in fuller detail.

In particular, the method and apparatus has been found useful in the manufacture of composite integrally bonded make-and-break electrical contacts in the form of rivets or screws, although numerous other configurations readily lend themselves advantageously thereto.

Although the preesnt invention has heretofore been described with respect to the intermolecular bonding or cold welding of two components, it is intended that three or more materials may be joined together, as described more fully below.

Similarly, although the bonding or welding of silver and copper wire segments is more particularly described hereinafter, such is not to be construed as limiting. Thus, the wire segments for which the contact working face portion components are formed may be constituted of gold, silver, platinum or palladium, alloys of gold, silver, platinum, palladium, ruthenium or iridium, and ductile mixtures containing at least one material selected from the group consisting of gold, silver, platinum, palladium, ruthenium or iridium. Moreover, the wire segments from which the contact body portion components are formed may be alternatively constituted of base metal materials such as copper, nickel, iron or aluminum, or alloys of copper or iron.

For a fuller understanding of the nature and objects of the present invention, reference is made to the following detailed description of the practice of preferred embodiments thereof, taken in conjunction with the accompanying drawings, in which:

FIGURES 1 and 2 are schematic views, partially in section, showing several stages in the forming of a composite intermolecularly bonded electrical contact element according to this invention;

FIGURE 3 is an enlarged sectional view of the composite electrical contact element during one of the manufacturing stages according to the invention;

FIGURE 4 is an enlarged sectional view of the electrical contact element after removal from the apparatus hereof;

FIGURE 5 is a sectional view along line 5—5 in FIGURE 4;

FIGURE 6 is an enlarged sectional view of an alternate embodiment of the electrical contact element during one of the manufacturing stages according to this invention;

FIGURE 7 is an enlarged sectional view of the electrical contact element of FIGURE 6 after removal from the apparatus of this invention;

FIGURE 8 is a sectional view along line 8—8 in FIGURE 7;

FIGURE 9 is a schematic view, partially in section, of a welding apparatus provided in accordance with this invention; and FIGURES 10 to 15 show various embodiments and stages in the formation of composite electrical contact elements manufactured according to the invention.

Referring now in detail to the drawings, FIGURE 1 illustrates a shearing and bonding apparatus 10. The apparatus 10 essentially includes three or more concentric rings 11, 12 and 13, which define a turntable. The rings are attached to one another, rotating in unison. Rings 11 and 13 are formed of an electrically conductive material, such as copper or steel, whereas ring 12 is formed of a non-conductive material, such as nylon or a suitable ceramic. Although the rings 11 to 13 are rigidly interconnected, rings 11 and 13 are electrically insulated from each other.

In each of the rings 11 to 13, there are provided a plurality of radially extending recesses, shown as recesses 14 in ring 11, recesses 15 in ring 12, and recesses 16 in ring 13. The recesses 14, 15 and 16 are in radial alignment, adapted to receive wire members 17 and 18 for purposes hereinafter explained. A feed guiding passage 19 is provided through which wire member 17 may be fed into recess 14 in ring 11 aligned therewith. Similarly, a feed guiding passage 20 is provided through which wire member 18 may be fed into recess 16 in ring 13, with which it is aligned.

The extent of radially inward feed of wire 17 through recess 14 is limited by stop member 21 interposed between rings 11 and 12. In a like manner, the extent of feed of wire 18 is restricted by a stop member 22 interposed between rings 12 and 13.

During operation of the apparatus 10, the turntable consisting of rings 11 to 13 is rotated in the direction of arrow A. The rotation of ring 11 forces the wire 17 protruding outwardly of ring 11 against a shear blade 23, which cuts the wire, forming a wire segment 24 within recess 14. Concurrently therewith, a shear blade 25, positioned radially inward of ring 13, severs a wire segment 26, positioned in recess 16 from wire 18.

In view of the foregoing, there are thus provided two wire segments 24 and 26 positioned, respectively, in recesses 14 and 16 in spaced end-to-end relation. Rotation of the assembly 10 is then continued until wire segments 24 and 26 are located at station B. During rotation the spaced wire segments 24 and 26 are maintained in their spaced relationship through the restraining action of a plurality of parallel arcuate guiding members or rails. Wire segment 24 is guided between rails 27 and 28, whereas wire segment 26 is correspondingly guided between rail members 29 and 30.

At position B the wire segments 24 and 26 are subjected to axial pressure applied by means of plunger or punch 31 acting on the end of wire segment 24 in opposition to a punch 32 acting on the end of wire segment 26. The compressive forces applied to the ends of the wire segments 24 and 26 effect abutment of the segments and forms an inter-molecular bond at their interface. This is more clearly illustrated in FIGURES 3 to 5, wherein the intermolecular bond at the interfaces of wire segments 24 and 26 may be noted.

Recess 15 in ring 12 is of a generally frusto-conical configuration having its base adjacent ring 13 and its narrow face disposed radially outward toward ring 11. Thus, when intermolecular bonding at the interfaces of wire segments 24 and 26 is achieved, there is a simultaneous upsetting and deformation of the bonded wire segments to conform with the shape of recess 15.

Ejection of the bonded wire segments 24 and 26 is effected by rotating the assembly 10 beyond position B and applying a radially outward force against the end of wire segment 26. This will result in the composite bonded element being ejected radially outwardly through recess 14 in ring 11. A particular advantage in ejecting the bonded elements in this manner is that the expanded conical portion of the composite element in the region of the intermolecularly bonded interfaces thereof is forced inwardly and "wiped" down as shown in FIGURE 4. An even more effective and desirable mechanical bond between wire segments 24 and 26 is thereby produced.

Composite contact elements may thus be successively produced by intermittently feeding wires 17 and 18 into the apparatus 10, rotating the turntable comprised of the concentric rings 11, 12 and 13 to feed successive aligned pairs of segments 24 and 26 into bonding station B, bonding such segments to form the desired composite contact elements, further rotating the turntable to remove the successively formed elements from the bonding station, and successively ejecting the composite elements from the apparatus.

Preferably, each wire segment 24 is constituted of silver for forming the contact working face portion of the composite electrical contact element, whereas each wire segment 26 is desirably constituted of copper for forming the contact body portion thereof. Although the use of silver and copper as the materials for the wire segments is preferred, other metals may be used as hereinbefore described.

In order to enhance the degree or quality of the interface intermolecular bonding between wire segments 24 and 26, the surface of guide rails 28 and 29 which contact the end faces of the wire elements may be roughened or serrated. The frictional contact between these surfaces and the end of the wire elements fed adjacent thereto will abrade the latter, thereby providing a superior surface finish for bonding of the contiguous end faces of the wire segments.

At times it may be preferable that the end of wire segment 24, which is distal to the end being bonded to wire segment 26, be enlarged or shaped into a semi-finished form for an electrical make-and-break contact element. In such instance punch 31 may be replaced by a die member 33 (FIGURE 6) having a recessed contour 34 which will form an enlarged portion 34a on wire segment 24 concurrent with the intermolecular bonding process previously described. After ejection of the thus bonded segments 24 and 26 as shown in FIGURES 7 and 8, the expanded portion in the region of the interfacial bonding of the wire segments is "wiped" down, whereby the silver segment 24 forms a firm mechanical bond with the copper segment 26.

In another embodiment, shown in FIGURE 2 of the drawings, the wire segments 24 and 26 may also be electrically welded or high-frequency eutectic bonded together after, or in lieu of, the intermolecular bonding effected at station B of the apparatus 10. In accordance with such embodiment wire segments 24 and 26 may be rotated by the turntable of apparatus 10 into position C. There the segments are subjected to an axial compressive force applied to wire segment 24 by a welding electrode 35, and to wire segment 26 by welding electrode 36. The electrical current passing through the wire segments from the electrodes will then firmly weld the segments together.

As shown in detail in FIGURE 9, the welding electrode 35 thus utilized and electrically conductive ring 11 are electrically connected to a common terminal T–1. Similarly, welding electrode 36 and electrically conductive ring 13 are electrically connected to a common terminal T–2. When wire segments 24 and 26 are brought together for welding in station C, wire segment 24 not only receives electrical current and pressure through welding electrode 35, but also additional current through its area in contact with ring 11. Likewise, wire segment 26 receives electrical current and pressure through electrode 36, and additional electrical current through its area contacting ring 13. The use of the common terminals T-1 and T-2 for the welding electrodes and the rings, thus providing common polarities, eliminates or sufficiently ameliorates any tendency of wire element 24 to weld to ring 11, or wire element 26 to weld to ring 13. The possibility of a short circuit between electrode 35 and ring 11, or electrode 36 and ring 13, in the remote event that no wire segments 24 or 26 are present in recesses 14 or 16, or if the wire segments are not in proper physical contact in recess 15 of ring 12, is thus prevented.

After the welding sequence in position C is completed, the welded wire segments 24 and 26 may then be rotated by apparatus 10 to station D (FIGURE 2), where suitable means may be provided for ejecting the successively formed composite contact elements from the apparatus.

In some instances it may be desired to join three metals together, for example, silver-copper-silver, or silver-copper-iron. In such instance, a further station may be added to the apparatus, having a feed means similar to feed passage 20 and an additional cut-off blade similar to 25, whereby the third wire segment may be aligned with and bonded to the wire segments 24 and 26. If desired, the welding electrodes 35 and 36 may exert sufficient pressure and supply electrical current to simultaneously bring all three wire segments into abutting relationship and weld them together into a unitary element. As shown in FIGURE 10, wire segments 24 and 26 may thus be bonded to a third segment 37. After ejection from apparatus 10, the expanded portion is "wiped" down, as shown in FIGURE 11.

FIGURES 12 to 15 are illustrative of various configurations to which the joined segments lend themselves, after coining or heading into finished shapes. All of these forms are then suitable for use in commonly known make-and-break electrical contact elements.

The foregoing thus shows an improved method and apparatus for the manufacture of electrical make-and-break contact elements from composite intermolecularly bonded metallic segments. It will be understood, however, that the invention is obviously subject to variations and modifications without departing from its broader aspects. Accordingly, it is intended that the preceding description is illustrative only and should not be construed in a limiting sense.

I claim:

1. A method of forming a composite electrical contact element from continuous lengths of metallic wires, said element incorporating a contact working face portion and, integral therewith, a contact body portion, said method comprising:
    (a) positioning said wires in spaced end-to-end relation;
    (b) shearing a longitudinally elongated first component for forming said contact working face portion from a first of said wires;
    (c) concurrently shearing a longitudinally elongated second component for forming said contact body portion from a second of said wires, said shearing sequences being effected while imparting simultaneous arcuate rotational movement to said components in a plane parallel to the longitudinal axes of said wires;
    (d) positioning said first and second components in spaced end-to-end relation at an arcuate displacement from said initial shearing position;
    (e) imparting axial pressure to said components to bring them into end-to-end abutting relation, and concurrently expand said components adjacent their interface to produce bonding therebetween and to frusto-conically shape the exterior thereabout, said shape diverging on one component and terminating on the other component;
    (f) rotating said bonded components an additional arcuate displacement from said initial shearing position; and
    (g) applying an axial force to one end of said bonded components to concurrently cause the "wiping down" of said shape at the bonded region and the ejection of said element.

2. The method of claim 1, in which imparting of axial pressure to said components shapes said contact working face portion into an enlarged head and an elongated shank segment.

3. The method of claim 1, in which said components are rotated an additional angular displacement from said initial shearing position, and an electrical current is applied thereto to electrically weld or high-frequency eutectically bond said components.

4. The method of claim 3, in which said electrical current is applied to said components while imparting axial pressure to the ends thereof.

5. The method of claim 3, in which said electrical current is applied to said components while imparting axial pressure to the ends thereof, and concurrently shaping said contact working face portion into an enlarged head and elongated shank segment.

6. The method of claim 1, in which said first component is constituted of a precious or semi-precious metal composition constituted of gold, silver, platinum, palladium, alloys of gold, silver, platinum, palladium, ruthenium or iridium, or ductile mixtures containing at least one of such materials; and in which said second component is constituted of copper, nickel, iron or aluminum, or alloys of copper or iron.

7. The method of claim 1, in which said first and second components are maintained in said spaced end-to-end relation prior to bonding thereof, by means of guiding members.

8. The method of claim 1, in which said first and second components are maintained in said spaced end-to-end relation prior to bonding thereof by means of guiding members, said components being adapted to have their contiguous end surfaces abraded through frictional engagement with one of said guiding members, whereby the degree of bonding at the interfaces of said first and second components may be enhanced.

References Cited

UNITED STATES PATENTS 3,093,018    6/1963    Rozmus _____ 29—470.1 XR
3,279,505   10/1966    Renz et al. _____ 29—630

FOREIGN PATENTS 1,243,746    9/1960    France.

CHARLIE T. MOON, *Primary Examiner.*

R. W. CHURCH, *Assistant Examiner.*